Aug. 2, 1938. W. J. MADDOX Re. 20,817
ABRADING ROLL
Original Filed Aug. 19, 1926
Fig. 2.
Fig. 1.
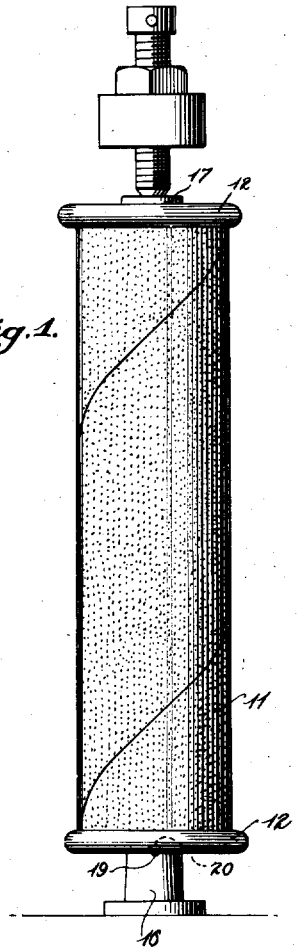
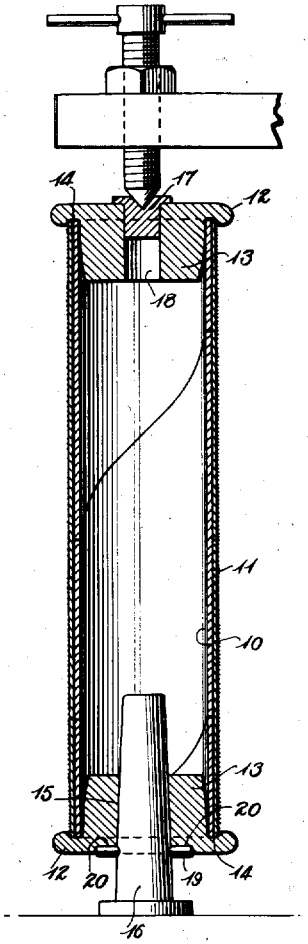
Fig. 3.
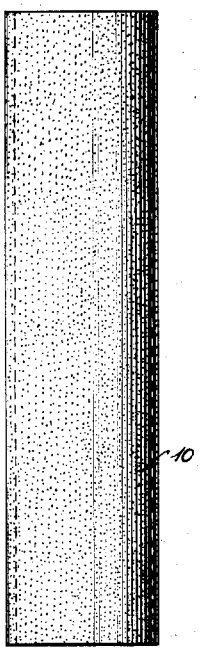
Fig. 4.
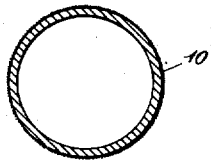
Inventor
William J. Maddox
By Chas. Thurmey
his Attorney Reissued Aug. 2, 1938

Re. 20,817

UNITED STATES PATENT OFFICE 20,817

ABRADING ROLL

William J. Maddox, Jamestown, N. Y., assignor to Even-Cut Abrasive Band & Equipment Corporation, Cleveland, Ohio, a corporation of Ohio Original No. 1,883,747, dated October 18, 1932, Serial No. 130,245, August 19, 1926. Application for reissue December 4, 1933, Serial No. 700,910

4 Claims. (Cl. 51—194)

This invention relates to improvements in abrading rolls and particularly to abrading rolls for use in wood dressing apparatus commonly known as spindle sanders.

One object of the invention is to provide an abrading roll which is comparatively inexpensive to produce and whose abrading surface only need be discarded when the roll is worn out. In the present roll, the abrading surface is self-supporting but possesses some degree of resiliency so that it may yield somewhat when the article being worked upon is pressed against it during the sanding operation. This yielding characteristic of the roll is the same as a cushioning effect, a property which is heretofore being secured by the provision of a cushion of felt, rubber or other material interposed between the abrading surface and the base member of the roll.

A further object is to provide a roll of comparatively light weight and one that is evenly balanced whereby the roll may be operated at a comparatively high rate of speed.

Another object contemplated is the provision of a roll wherein the abrading material is firmly attached or secured to the surface of the roll, instead of having such material carried by a sheet attached to a drum, so that no means are necessary in the present case for stretching or taking up any looseness in the sheet carrying the abrasive material. More specifically the roll contemplated by the present invention comprising a hollow member or body portion, preferably formed of paper board or other composition of vegetable fiber, to which the abrasive material is firmly attached by some adhesive such as glue. At its ends said body portion is provided with means for mounting it in the sanding machine. These means may take various forms, being shown in the present instance as end cap pieces which may be made up from wood, metal or the like. The cap pieces illustrated comprise a shank which enters the hollow body portion and a head forming a shoulder having a groove therein in which the end of the body portion seats.

In the accompanying drawing:

Figure 1 is an elevational view of a roll embodying the present improvements;

Fig. 2 is a sectional view longitudinally of the roll illustrated in Fig. 1;

Fig. 3 is an elevation of a modified form of roll; and

Fig. 4 is a transverse sectional view of the roll shown in Fig. 3.

For purposes of economy the body portion 10 of the roll is preferably made up in the form of a hollow cylinder formed of heavy paper or pasteboard to which the abrasive material may be applied by dusting it thereon, so to speak, or it may be applied in sheet-like form. In Figs. 1 and 2 the abrasive material is in sheet form, the sheet 11 being attached permanently and fixedly to the paper body 10 with an adhesive such as glue or the like. In Figs. 3 and 4 the paper body 10 is coated with an adhesive and the abrasive material dusted thereon. When the abrasive material is applied in a sheet, as in Figs. 1 and 2, the sheet is wound spirally of the roll so that the seams formed by successive convolutions will not produce any markings on the article being sanded.

In each form of roll the hollow tubular body portion 10 is provided with means for mounting it in the sanding machine for rotation when in operation. Such means may consist of end pieces, preferably in the form of caps which substantially close the ends of the tube. The preferred form is shown in the present instance wherein the cap comprises a head 12 and a shank 13 of reduced cross section which projects a short distance into the interior of the body 10. The shank 13 makes a close friction fit in said body so as to retain therein and the shoulder formed by the head 12 has a circular groove 14 therein in which the end of the body 10 seats. The cap at one end of the roll is formed with a central tapered bore 15 in which a correspondingly tapered spindle 16 of the sander is inserted, the roll being held tight on said spindle by a centering point 17 which is received in a suitable recess 18 in the other end cap of the roll. Said centering point can be an ordinary set screw threaded in a bracket of the sander so as to force the roll on the tapered spindle 16. To transmit rotary motion from the spindle to the roll, said spindle may have a cross pin 19 which fits in a slot 20 extending transversely of the central bore 15 of the cap pieces.

It will be understood that the hollow body portion 10 may be made up from any suitable material but paper is preferred as it is inexpensive, light and ordinary glue adheres firmly thereto. Due to the light weight of paper and the even distribution of the weight thereof, the roll is evenly balanced and may be operated at an exceedingly high rate of speed. With solid wooden rolls, the weight may or may not be evenly distributed and the same speed of rotation cannot be attained. On account of the low cost of the hollow body, users of the roll can discard the body portions 10 after they are worn out by withdrawing the frictionally retained end cap pieces and the latter can be used with new bodies. The shanks 13 of the cap pieces extend only a short distance into the body portion and while the latter is self-sustaining nevertheless it possesses a certain degree of give or resiliency which is quite a desirable characteristic. The desirability thereof is patent from the fact that in some instances prior art rolls having solid bodies have been provided with a cushion interposed between said solid body and the abrasive material to secure this resiliency.

What I claim is:

1. An abrading roll comprising a pair of end pieces adapted for reception upon the roll mounts of a rotary abrading machine, and an abrasive coated unitary tubular member of stiff paper composition supported only adjacent its ends by said end pieces.

2. An abrading roll comprising a pair of end pieces adapted for reception upon the roll mounts of a rotary abrading machine and a replaceable abrading element consisting of a single tube of stiff but inherently resilient material coated with abrasive and supported only adjacent its ends by said end pieces.

3. In a method of making a tubular abrasive element, the steps which consist in wrapping spirally upon a hollow mandrel an abrasive coated strip with the edges of adjacent convolutions in contact with each other, and securing said strip to said mandrel by interposing a layer of adhesive.

4. An abrasive element comprising a hollow cylindrical mandrel and a spirally wrapped abrasive coated sheet adhesively secured to said mandrel and completely covering the outer surface thereof, the convolutions of said sheet having adjacent edges in contact without overflowing.

WILLIAM J. MADDOX.